United States Patent
Cao et al.

(10) Patent No.: US 6,714,699 B1
(45) Date of Patent: Mar. 30, 2004

(54) MULTI-WAVELENGTH NON-LASER LIGHT SOURCE

(75) Inventors: Simon X. F. Cao, Fremont, CA (US); John Arthur Fee, Richardson, TX (US)

(73) Assignee: Avanex Corporation, Fremont, CA (US)

( * ) Notice: Subject to any disclaimer, the term of this patent is extended or adjusted under 35 U.S.C. 154(b) by 267 days.

(21) Appl. No.: 09/693,532

(22) Filed: Oct. 19, 2000

(51) Int. Cl.[7] .............................................. G02B 6/26

(52) U.S. Cl. ............................................ 385/17; 385/147

(58) Field of Search ............................ 385/17, 30–37, 385/147

(56) References Cited

U.S. PATENT DOCUMENTS

| | | | | |
|---|---|---|---|---|
| 5,032,002 A | * | 7/1991 | Fonneland et al. | 349/104 |
| 5,170,290 A | | 12/1992 | Land et al. | 359/579 |
| 5,225,930 A | | 7/1993 | Land et al. | 359/578 |
| 5,663,822 A | | 9/1997 | Fee | 359/161 |
| 5,699,378 A | | 12/1997 | Lealman et al. | 372/102 |
| 6,198,531 B1 | * | 3/2001 | Myrick et al. | 356/300 |
| 6,256,428 B1 | * | 7/2001 | Norwood et al. | 385/17 |

OTHER PUBLICATIONS

Sasamori, Hideto; Isshiki, Kunihiko; Watanabe, Hiromitsu and Kasahara, Kumio, "Multi–wavelength Erbium–Doped Fiber Ring Light Source with Fiber Grating Filter," *OSA Technical Digest*, Jul. 21–23, 1997, pp. 235–238.

* cited by examiner

*Primary Examiner*—Akm Enayet Ullah
(74) *Attorney, Agent, or Firm*—Sawyer Law Group LLP

(57) ABSTRACT

The present invention provides a method and system for providing a light source in an optical network. The method includes providing a multiple-wavelength light, and filtering the multiple-wavelength light into a plurality of separated wavelength bands for a plurality of channels. In the preferred embodiment, each of the separated wavelength bands is substantially centered about the wavelength of a respective one of a plurality of optical channels. The plurality of separated wavelength bands is stabilized and then provided to the optical network. The light source in accordance with the method and system of the present invention is designed to only output wavelengths that correspond to optical transmission channels while eliminating the rest. It suppresses possible mode hopping, thus maintaining the power stability of all channels. Since multiple wavelengths are provided in a single light source, the number of light sources required to service a network can be dramatically reduced, increasing efficiency and reducing the cost of equipment and time for maintenance as well.

18 Claims, 18 Drawing Sheets

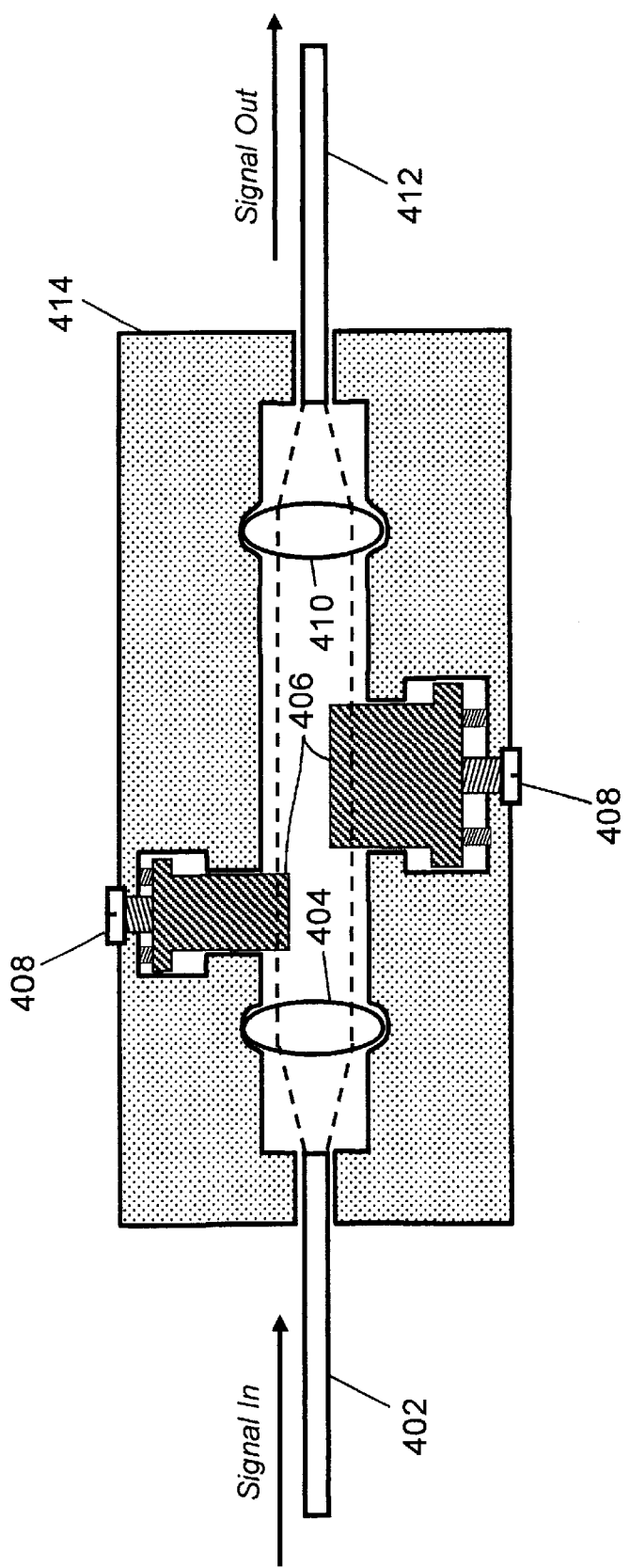

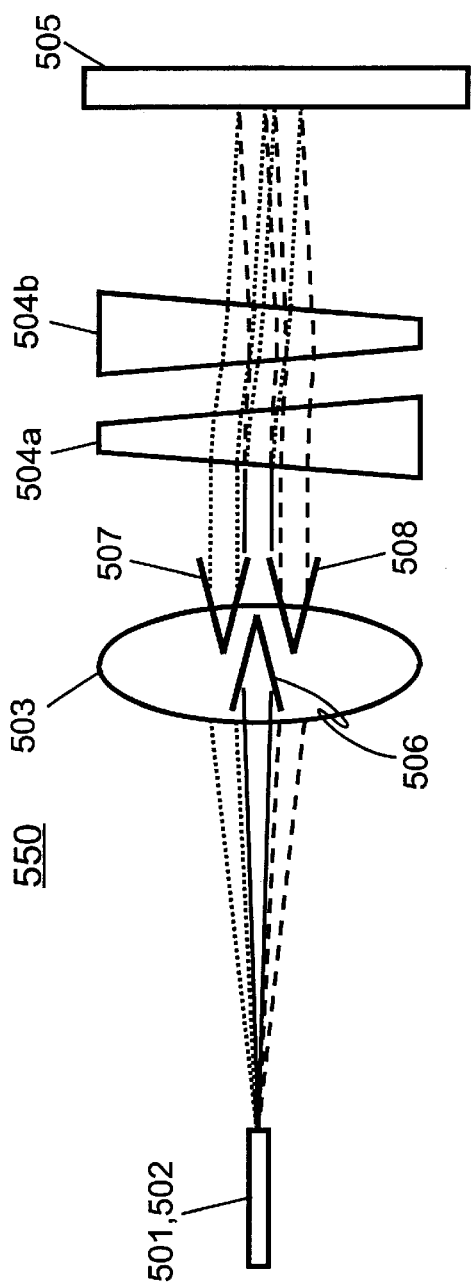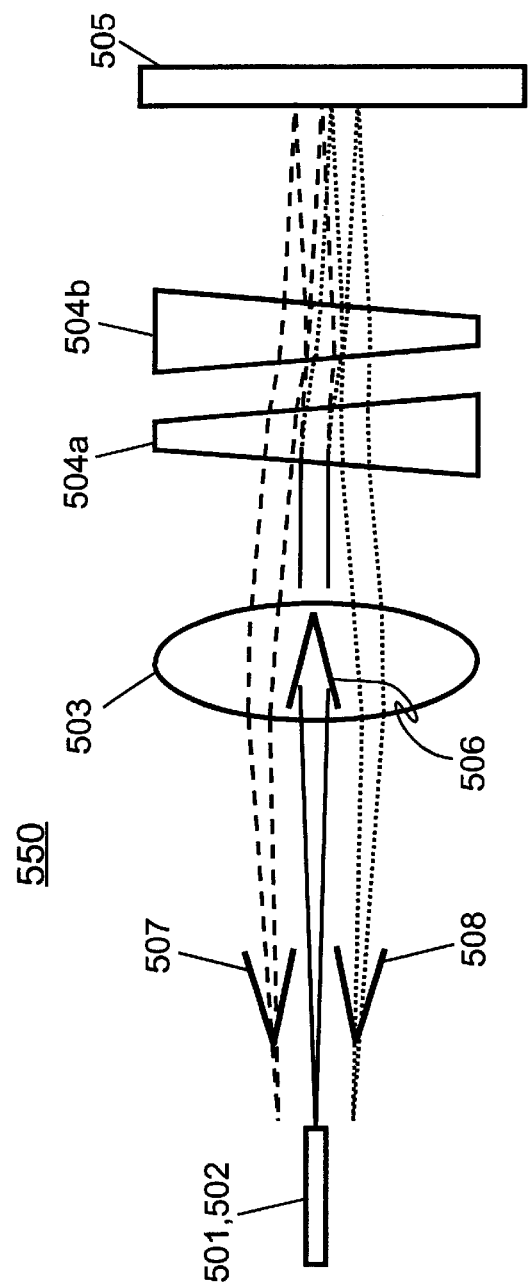
Figure 5d

MULTI-WAVELENGTH NON-LASER LIGHT SOURCE

FIELD OF THE INVENTION

The present invention relates to fiber optic networks, and more particularly to light sources in a fiber optic network.

BACKGROUND OF THE INVENTION

Fiber optic networks are becoming increasingly popular for data transmission due to their high speed and high capacity capabilities. In response to the demand for ever higher capacity fiber optic networks, network components are designed to provide greater and greater information carrying capacity. This increases the need for greater numbers of information-carrying channels (e.g. "wavelengths") within the network. As the number of wavelengths increases, so does the demand on the number of lasers required to maintain a laser source system in a network.

FIG. 1 illustrates one type of conventional laser source system for a fiber optic network. Assume that a fiber optic network or cable comprises ten wavelength division multiplexer (WDM) systems 102a–102j. Each system comprises n wavelengths. Each "wavelength" corresponds to a respective information-carrying channel wherein each channel comprises a restricted range or band of wavelengths. Each channel carries a respective signal. One laser light source is used for each wavelength in a system. Thus, for n wavelengths in system 102a, n lasers 104.1–104.n are required; for n wavelengths in system 102b, n lasers 106.1–106.n are required; and for n wavelengths in system 102j, n lasers 108.1–108.n are required. For example, if each system comprises 64 wavelengths, with ten systems, the fiber optic network requires 640 lasers.

As information carried over optical networks increases, the channels are spaced more closely (in wavelength) and therefore the pass bands of the channels become narrower, placing more stringent requirements on the lasers' wavelength precision. Instability and imprecision can be caused by drift, mode hopping, and crosstalk, for example. Drift refers to the difference between an actual wavelength and the nominal center wavelength of the respective channel. If drift occurs, crosstalk between channels will be too large. Crosstalk occurs when one channel or part of a channel appears as noise on another channel adjacent to it. By using one laser per wavelength per system, each laser may be designed to provide a particular wavelength in a very stable manner with uniform intensity. However, lasers are expensive and the requirement of one laser per wavelength per system burdens the network operator with high costs. Also, with so many lasers in different locations, maintenance and service of the lasers are expensive and time consuming.

One conventional way of decreasing this burden is illustrated in FIG. 2. FIG. 2 illustrates a centralized laser source transmission system 200. In the system 200, one high powered laser is used for each wavelength. The optical power from each laser is delivered to a respective one of the output lines 205.1–205.n and then is split among the systems in the network. For example, assume the network has ten WDM systems 202a–202j, each comprising n wavelengths. For n wavelengths, n lasers 204.1–204.n are used, each emitting a single wavelength at ten times the power normally required for a single system. For instance, laser 204.1 emits light at wavelength $\lambda_1$, laser 204.2 emits light at wavelength $\lambda_2$, etc. The wavelength $\lambda_1$ from laser 204.1 is split ten ways among the systems 202a 202j. The same is true for the wavelengths $\lambda_2$–$\lambda$n from lasers 204.2–204.n. The n wavelengths delivered to each of the systems 202a–202j are modulated, are multiplexed by a respective wavelength division multiplexer (MUX) 210a–210j and then are output via a respective one of the output fiber optic lines 212a–212j. Thus, for systems comprising 64 wavelengths each, instead of requiring 640 lasers as with the network illustrated in FIG. 1, the network in FIG. 2 only requires 64 lasers. Although this reduces the cost for lasers, there is a cost involved in providing high powered wavelengths. The maintenance and service of this number of single wavelength lasers is still costly and time consuming.

Accordingly, there exists a need for a multi-wavelength light source for an optical network. The light source should not compromise the stability of the wavelengths. It should reduce the costs of operating and maintaining the network. The present invention addresses such a need.

SUMMARY OF THE INVENTION

The present invention provides a method and system for providing a light source in an optical network. The method includes providing a multiple-wavelength light, and filtering the multiple-wavelength light into a plurality of separated wavelength bands for a plurality of channels. In the preferred embodiment, each of the separated wavelength bands is substantially centered about the wavelength of a respective one of a plurality of optical channels. The plurality of separated wavelength bands is stabilized and then provided to the optical network. The light source in accordance with the method and system of the present invention is designed to only output wavelengths that correspond to optical transmission channels while eliminating the rest. It suppresses possible mode hopping, thus maintaining the power stability of all channels. Since multiple wavelengths are provided in a single light source, the number of light sources required to service a network can be dramatically reduced, increasing efficiency and reducing the cost of equipment and time for maintenance as well.

BRIEF DESCRIPTION OF THE FIGURES

FIG. 4 illustrates a first preferred embodiment of a comb filter in the multi-wavelength light source in accordance with the present invention.

FIGS. 5c–5d illustrate a third preferred embodiment of a comb filter in the multi-wavelength light source in accordance with the present invention.

DETAILED DESCRIPTION

The present invention provides a multi-wavelength light source for an optical network. The present invention uses a comb filter which is able to filter the wavelengths into a plurality of separated wavelength bands that correspond to the channels to be used by the network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

To more particularly describe the features of the present invention, please refer to FIGS. 3 through 12 in conjunction with the discussion below.

Figure 3:
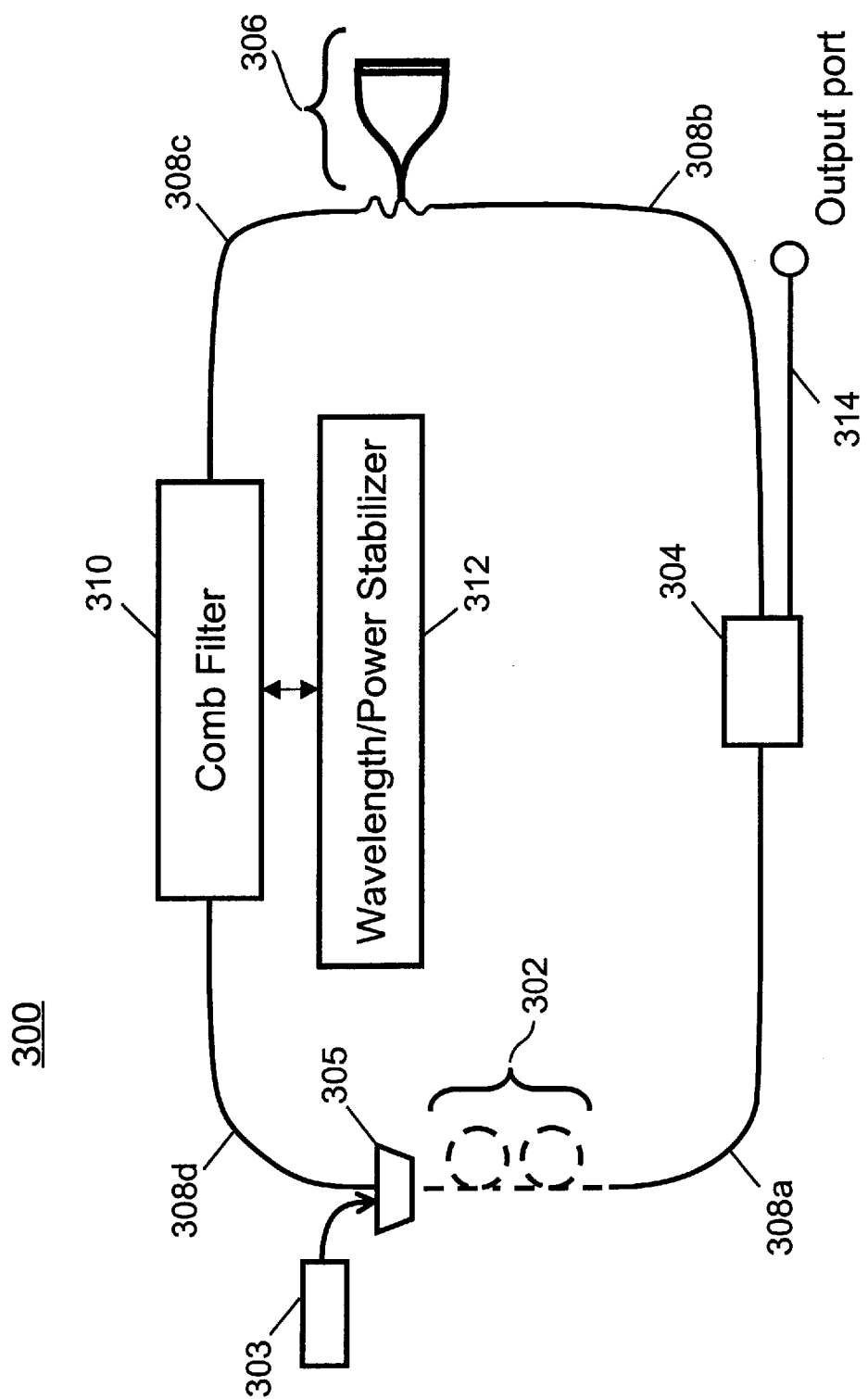
FIG. 3 illustrates a preferred embodiment of the multi-wavelength light source in accordance with the present invention.

FIG. 3 illustrates a preferred embodiment of the multi-wavelength light source in accordance with the present invention. The multi-wavelength light source 300 comprises a loop of devices coupled together with fibers 308a–308d. The devices include an erbium doped fiber 302 (EDF) pumped by a laser 303 as the initial light source. The light transmitted by fiber 308d and emitted by the laser 303 are multiplexed by the wavelength division multiplexer 305. The EDF 302 is coupled to a coupler 304 by a fiber 308a. The coupler 304 allows some of the light amplified by the EDF 302 to leave the loop and enter the network along a single-mode fiber 314. In the preferred embodiment, a 3 dB coupler which allows approximately 50% of the light to leave the loop is used. However, any type of coupler may be used without departing from the spirit and scope of the present invention. Coupled to the coupler 304 by another fiber 308b within the loop is a fiber-optic acoustical optic (AO) frequency shifter 306 which prevents lasing of the light source 300 as a ring laser. Lasing is undesirable because all of the energy from the light would be concentrated into the ring laser modes, which do not, in general, correspond to the desired channel wavelengths. By preventing the light source 300 from lasing, a light with multiple lengths is emitted. Coupled to the fiber-optic AO frequency shifter 306 by another is a comb filter 310 which filters the light from the shifter 306 so that only wavelengths corresponding to the channels of the network are passed therethrough. A wavelength and power stabilizer 312 is coupled to the comb filter 310. The wavelength/power stabilizer 312 detects deviations in the wavelengths and powers of the channels and corrects for them.

FIG. 4 illustrates a first embodiment of a comb filter which may be used in the multi-wavelength light source of the present invention. This comb filter comprises a split beam interferometer 400.

The comb filter 400 in accordance with the present invention (FIG. 4) comprises an input fiber 402 for carrying in light comprising a range of wavelengths. The light begins to diverge as it leaves the fiber 402, but a lens 404 collimates the light. Portions of the light are then interrupted by and forced to pass through glass blocks 406. The glass blocks 406 each have mechanical depth and tilt adjustments 408. The effect of the glass blocks 406 is to cause interference between portions of the light passing through each of the respective blocks. In this way, the light is filtered such that only wavelengths corresponding to channels are outputted. The filtered light is then converged by another lens 410 to output fiber 412. In the preferred embodiment, the elements 402–412 are enclosed by a casing 414.

Although the present invention is disclosed with mechanical depth and tilt adjustments, one of ordinary skill in the art will understand that any method of adjusting for the depth and tilt of the glass blocks may be used without departing from the spirit and scope of the present invention.

Although the present invention is disclosed with the elements 402–412 enclosed by a casing, one of ordinary skill in the art will understand that a casing need not be used, and the resulting device would still be within the spirit and scope of the present invention.

The glass blocks are individually tuned to the channels of the transmission signal. The signal is very sensitive to the thickness and refractive index of the glass blocks 406, the depth of the penetration of the glass blocks 406, and the tilt of the glass blocks 406. By adjusting the depth of penetration and tilt, a periodic transmission spectrum may be generated. Because the signal is very sensitive to the thickness, the comb filter 400 is sensitive to changes in temperature. To minimize the effects of temperature changes, the comb filter 400 may be constructed of a material with a low thermal expansion coefficient, or the glass blocks may comprise a material whose refractive index decreases with temperature in a fashion so as to counteract the optical effect of the thickness increase with temperature. An example of suitable low-thermal expansion materials include ULE® glass manufactured by Corning, Inc.® of Corning New York, USA, and Zerodur® glass manufactured by Schott Glass Technologies® of Duryea, Pa., USA. More precisely, it is preferable that $\delta\eta/\delta T \approx -\eta\alpha$, where $\eta$ is the refractive index, T is the temperature in Kelvin, and $\alpha$ is the material's coefficient of linear expansion. Although FIG. 4 shows the use of two glass blocks, any number of glass blocks may be used to affect the shape of the transmission spectrum to obtain an optimum shape.

Figure 5A:
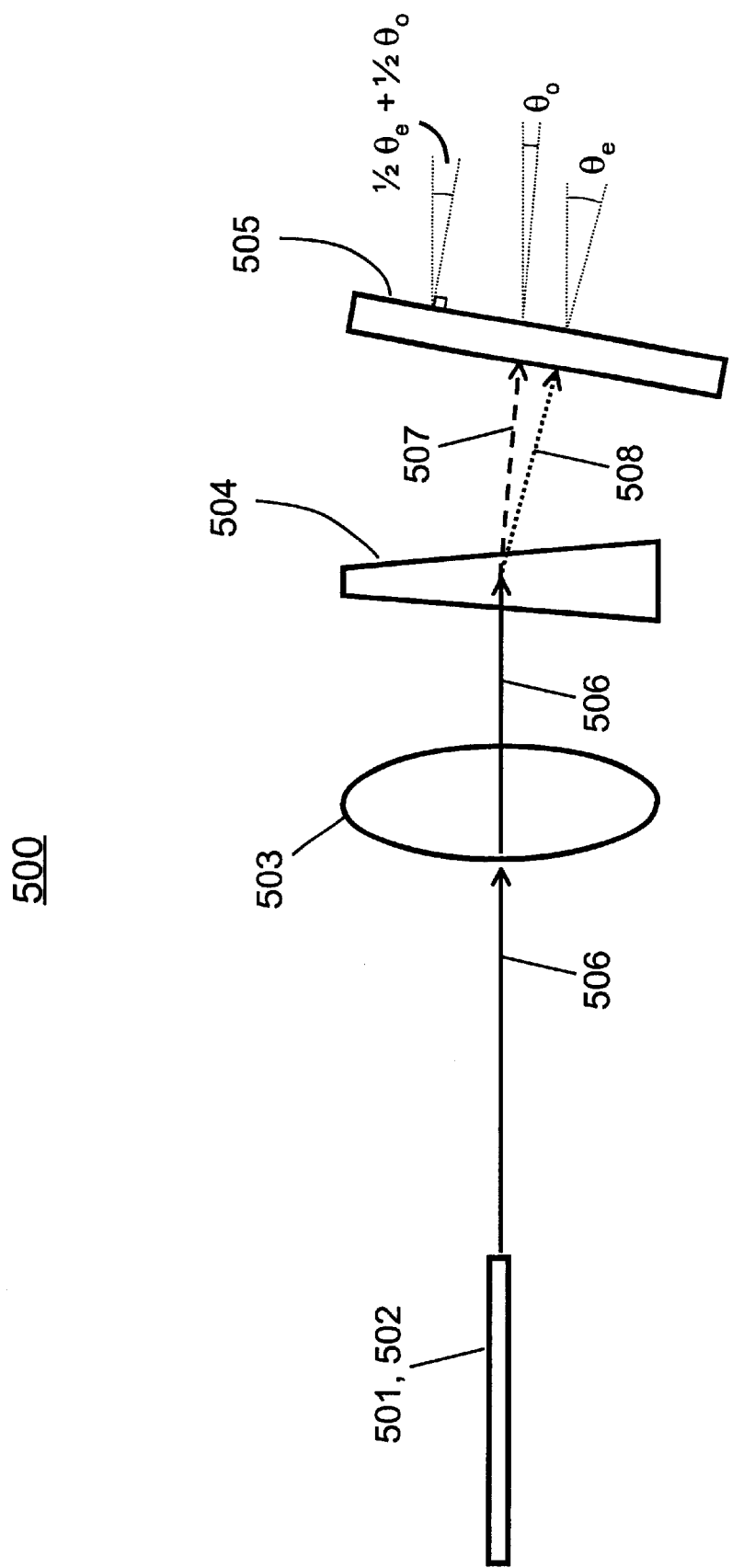
FIGS. 5a–5b illustrate a second preferred embodiment of a comb filter in the multi-wavelength light source in accordance with the present invention.
Figure 5B:
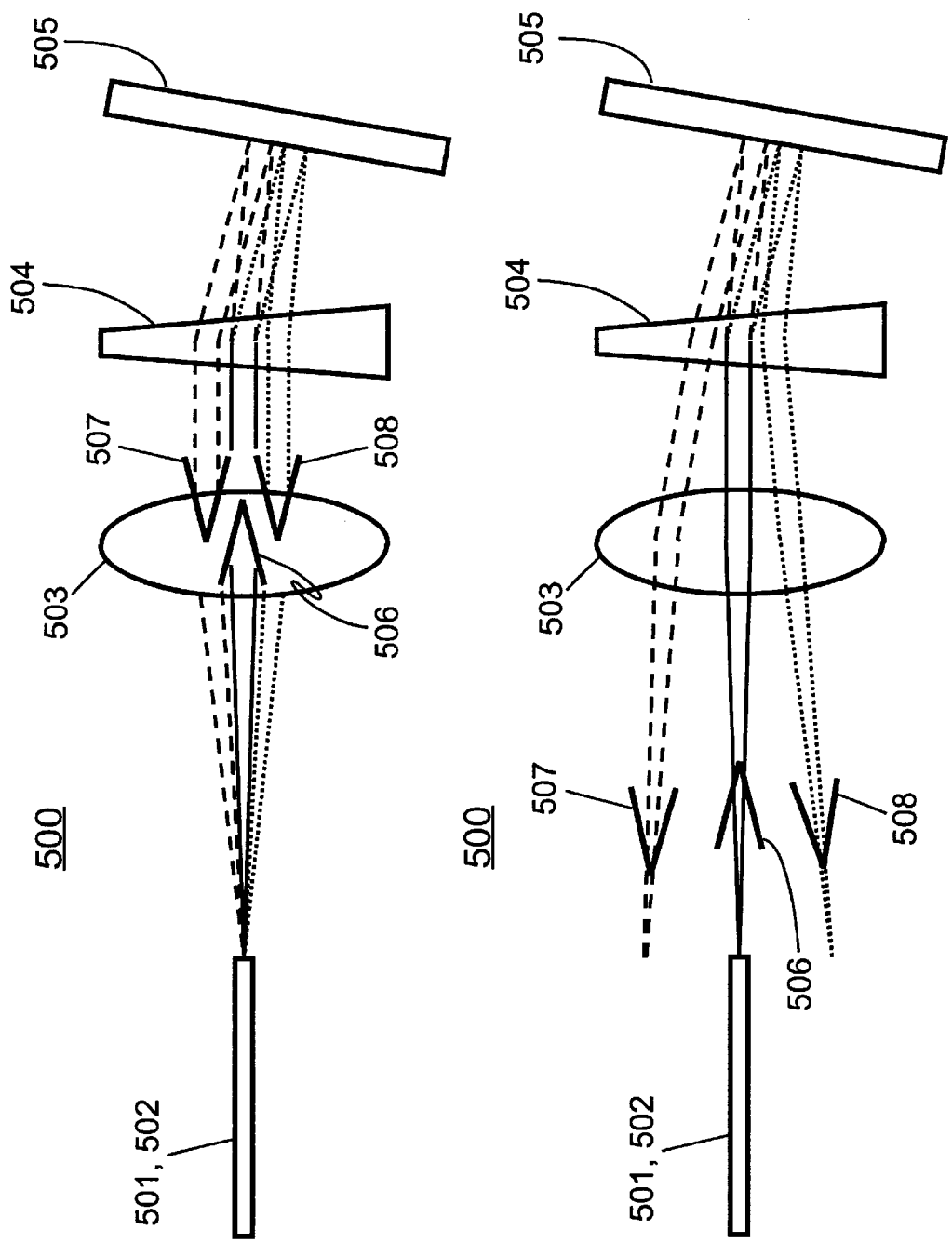

FIGS. 5a–5b illustrate a second preferred embodiment of a comb filter which may be used in the multi-wavelength light source in accordance with the present invention. This second embodiment is disclosed in U.S. Pat. No. 6,205,270.

U.S. Pat. No. 6,393,176, both assigned to the assignee of the present application. Applicant hereby incorporates these patents by reference.

The comb filter 500 (FIG. 5a–5b) comprises two optical fibers 501, 502 mounted in parallel and disposed side by side. Fiber 501 is used for light input and fiber 502 is used for light output. For geometric reference, the common axis of the two fibers 501 and 502 defines the axis of comb filter 500. The comb filter 500 also comprises a lens 503, a wedge-shaped plate 504 composed of a birefringent material such as calcite, rutile, or Lithium Niobate and a non-linear interferometer 505.

In a preferred embodiment (FIG. 5a–5b), the lens 503 is disposed such that it is centered on the comb filter axis at a distance from the end faces of input fiber 501 and output fiber 502 equivalent to its focal length,f. Also, the birefringent wedge 504 is disposed along the filter axis to the opposite side of the lens 503 from fibers 501 and 502, and the non-linear interferometer 505 is disposed to the opposite side of wedge 504 from lens 503. The non-linear interferometer 505 is oriented at an angle to the comb filter main axis as described in more detail following.

Through the well-known double-refraction effect, the birefringent wedge 504 causes a physical decomposition of any unpolarized light beam propagating therethrough such that, after having passed through the wedge 504, the energy of the beam will be distributed among two separate beams propagating in different directions, one from the other, and plane polarized at right angles to one another. If the incident beam comprises a light 506 as shown in FIGS. 5a–5b, then the two emergent beams from wedge 504 comprise two sub-lights 507 and 508. As shown in FIGS. 5a–5b, the angles of deflection of emergent sub-light 507 and of emergent sub-light 508 relative to the initial propagation direction of light 506 are defined as $\theta_o$ and $\theta_e$, respectively. In FIGS. 5a–5b, light 506 is illustrated as a solid line whereas sub-lights 507 and 508 are illustrated as dashed and dotted lines, respectively. As shown in FIG. 5a, the non-linear interferometer 505 is oriented such that the normal to a rear reflective surface forms an angle of $\frac{1}{2}\theta_e + \frac{1}{2}\theta_o$ with the comb filter main axis.

Figure 5C:
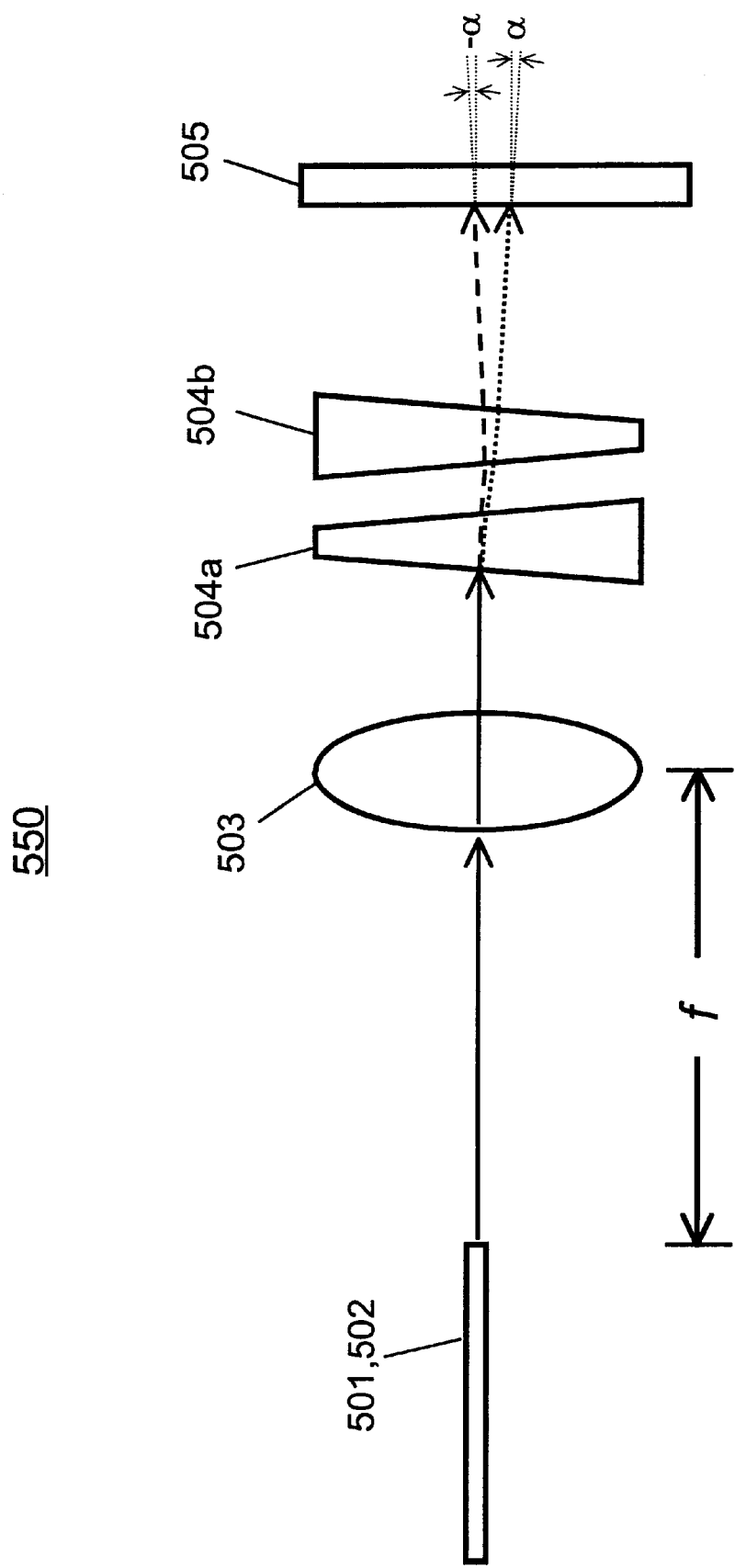

FIGS. 5c–5d illustrate a third preferred embodiment of the optical comb filter in the multi-wavelength light source in accordance with the present invention. In the optical comb filter 550, the input and output fibers 501–502 and the lens 503 are disposed similarly to the respective similarly numbered components of comb filter 500 (FIGS. 5a–5b). However, in the comb filter 550, a first birefringent wedge 504a and a second birefringent wedge 504b replace the single birefringent wedge 504 of the comb filter 500 (FIGS. 5a–5b) and a major dimension of the non-linear interferometer 505 is disposed at right angles to the main axis. Except for the change in tilt angle between the two comb filter embodiments, the non-linear interferometer 505 of comb filter 550 is identical to the non-linear interferometer of comb filter 500.

The shapes of the two wedges 504a-504b are substantially identical to one another except that the second wedge 504b is inverted relative to the first wedge 504a. The respective optic axes of the birefringent wedges 504a-504b are disposed perpendicular to one another such that one optic axis is substantially vertical within the plane of FIG. 5c and the second optic axis is perpendicular to the plane of FIG. 5c. Under these conditions, a light 506 incident upon the first birefringent wedge 504a is separated, upon traversing through the wedge 504a, into a first, less-deflected sub-light 507 and a second, more-greatly deflected sub-light 508. Each of the sub-lights 507–508 comprises polarized light wherein the two respective polarization directions are perpendicular to one another.

Because of the shapes and dispositions of the two wedges 504a-504b, the net deflection of the sub-light 508, upon passage through both wedges 504a-504b, is equal to $\alpha$ and the net deflection of sub-light 507 is equal to $-\alpha$, relative to the initial propagation direction of the light 506.

The filtering operation of either the optical channel comb filters 500 (FIG. 5b) or 550 (FIG. 5d) is similar. The top diagram in either FIG. 5b or FIG. 5d shows the pathways through the respective comb filter 500 or 550 of light comprising wavelengths corresponding to optical channels. The lower diagram in either FIG. 5b or FIG. 5d shows the pathways through the respective comb filter 500 or 550 of light comprising wavelengths midway between those of the optical channels. In either of the optical channel comb filters 500 (FIG. 5b) or 550, the non-linear interferometer 505 reflects light such that wavelengths corresponding to optical channels are reflected with a 90° rotation of its polarization plane orientation whilst the wavelengths midway between the channels are reflected without polarization plane rotation. Because of the polarization characteristics of the reflected portions of sub-lights 507 and 508, the light comprising wavelengths corresponding to optical channels are focused into the output fiber 502 but the light comprising wavelengths midway between the channels is brought to two foci, neither of which are coincident with the output fiber. Such latter wavelengths are thus filtered out by either of the comb filters 500 or 550.

The non-linear interferometer 505 is an instance of an invention disclosed in U.S. Pat. No. 6,169,604, assigned to the assignee of the present application. Applicant hereby incorporates this patent by reference.

Figure 6A:
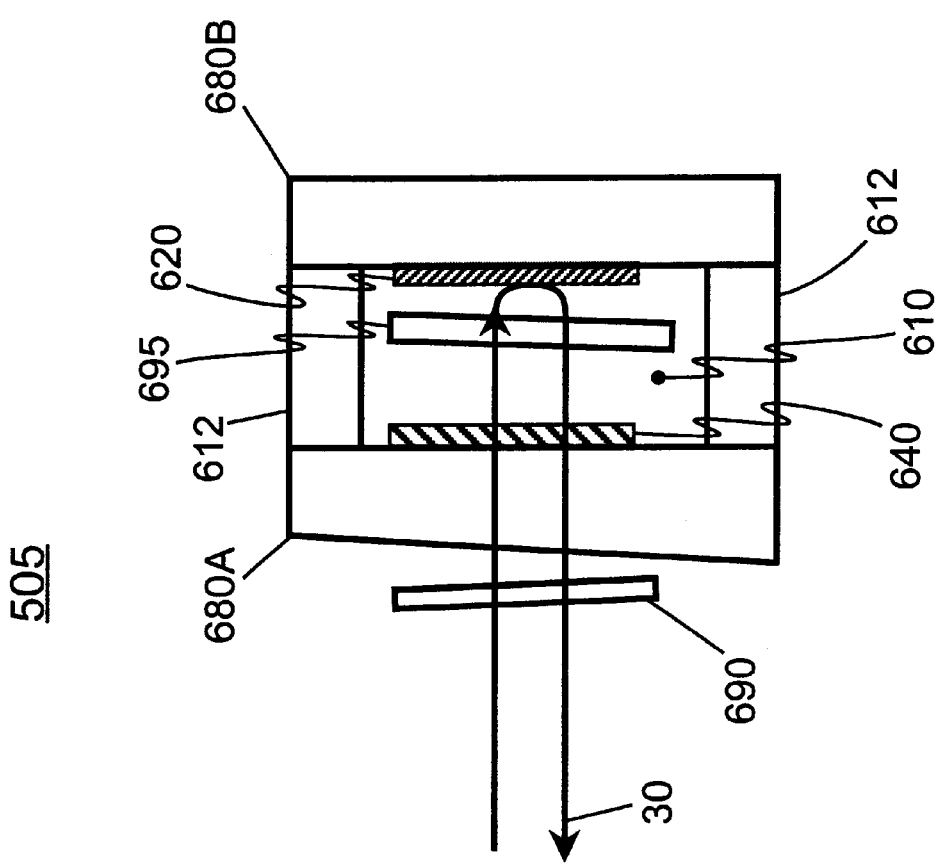
FIG. 6a illustrates a preferred embodiment of a nonlinear interferometer for the second and third preferred embodiments of the comb filter in the multi-wavelength light source in accordance with the present invention.

FIG. 6a illustrates a view of a preferred embodiment of a non-linear interferometer as utilized in the second and third preferred embodiments of the comb filter in the multi-wavelength light source in accordance-with the present invention. The interferometer 505 comprises two parallel glass plates 680A and 680B with a space or cavity 610 therebetween. The inside face of the glass plate 680B is coated with a layer of reflective coating 620 with a reflectivity preferably of 100%. The inside face of the glass plate 680A is coated with a layer of reflective coating 640 with a reflectivity preferably of approximately 18%. A quarter-wave plate 695 is disposed within the space 610 and an eighth-wave plate 690 is disposed adjacent to plate 680A and external to the space 610.

Figure 6B:
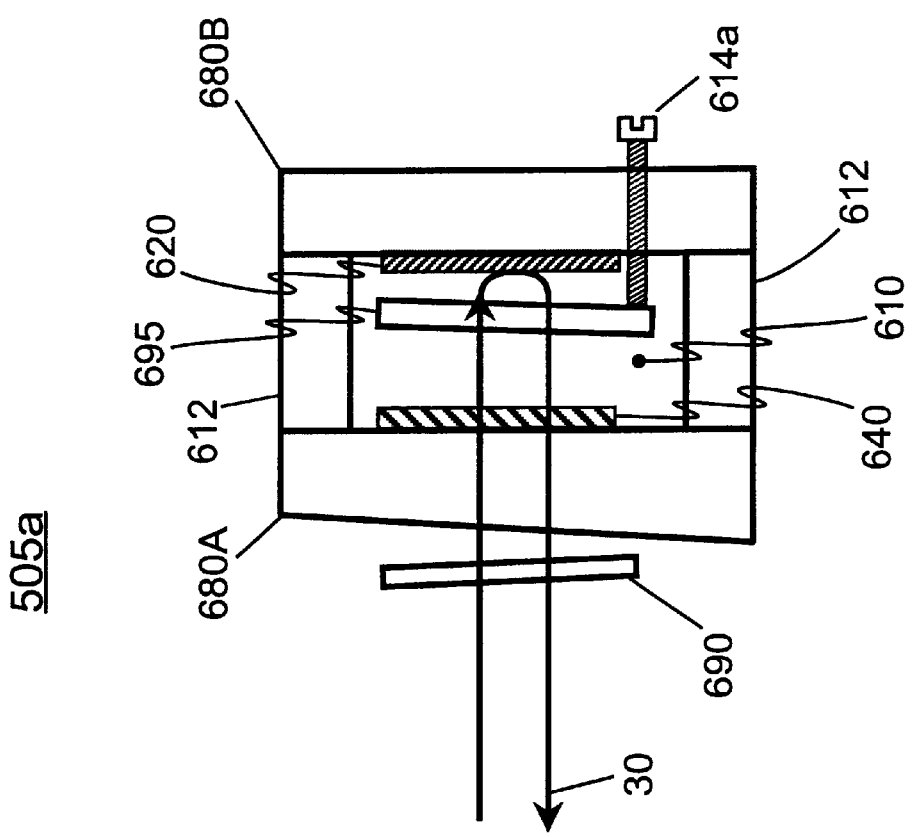
FIG. 6b illustrates a preferred embodiment of an adjustable non-linear interferometer for the second and third preferred embodiments of the comb filter in the multi-wavelength light source in accordance with the present invention.
Figure 6C:
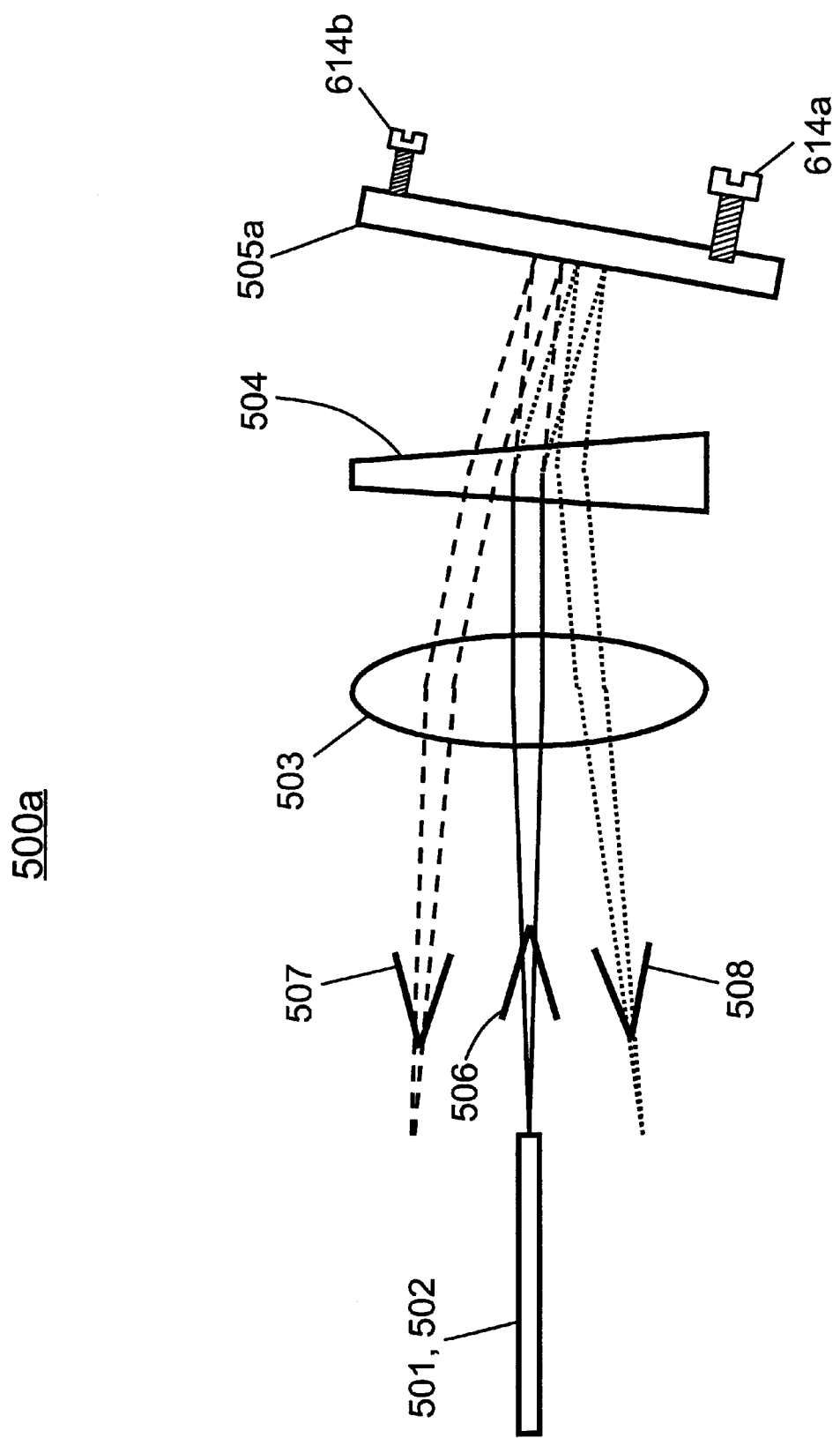
FIG. 6c illustrates a use of the adjustable nonlinear interferometer within an optical comb filter in the multi-wavelength light source in accordance with the present invention.

FIGS. 6b and 6c respectively illustrate a preferred embodiment of an adjustable nonlinear interferometer for the second and third preferred embodiments of the comb filter and the use of the adjustable non-linear interferometer within an optical comb filter in accordance with the present invention. The adjustable optical comb filter 500a(FIG. 6c) is based upon the comb filter 500 (FIGS. 5a–5b) by replacement of the non-linear interferometer 505 by the adjustable non-linear interferometer 505a(FIG. 6b). Although not specifically illustrated herein, another embodiment of an adjustable comb filter that is based upon the comb filter 550 may also be constructed. The adjustable non-linear interferometer and adjustable comb filters are disclosed in a co-pending United States patent application entitled "Method and Apparatus for Automated Alignment of Optical Devices of Wavelength Division Multiplexed Systems Utilizing a Tunable Laser with Rapid Wavelength Sweep", Ser. No. 09/579,955, filed on May 26, 2000, which is incorporated herein in its entirety by reference.

The adjustable non-linear interferometer 505a (FIG. 6b) is identical to the non-linear interferometer 505 except that the internal waveplate 695 may be tilted over a range of angles within the space 610, relative to the input direction of the light beam 30. A mechanical adjuster 614a is utilized to control the degree of tilt of the waveplate 695 (FIG. 6b). By controlling the tilt angle of the waveplate 695, the physical path length of the light beam 30 through the waveplate 695 may be controlled. This change in the physical path length traversed by light beam 30 through the waveplate 695 causes a change in the optical path length of the light beam 30 between the front reflective coating 640 and the rear reflective coating 620, because optical path length is equivalent to physical path length multiplied by the refractive index of waveplate 695. This changing optical path length causes, in turn, a shift in the wavelengths at which constructive and destructive interference occurs between the portions of light 30 reflected from reflective coating 640 and reflective coating 620. As a result, there is a shift in the wavelengths comprising light beam 30 whose polarizations are rotated and whose polarizations are not rotated upon reflection from the non-linear interferometer 505a.

From the above discussion, adjustment of the tilt angle of waveplate 695 by adjustments made to mechanical adjuster 614a controls the identities of wavelengths which are focused and which are not focused into the output fiber 502 in the comb filter 500a (FIG. 6c). A second mechanical adjuster 614b is-also provided in the comb filter 500a (FIG. 6c). The mechanical adjuster 614b causes rotation of the entire non-linear interferometer 505a relative to the main axis of the comb filter so as to improve alignment of the reflected portions of sub-lights 507–508 with the output fiber 502.

Figure 7A:
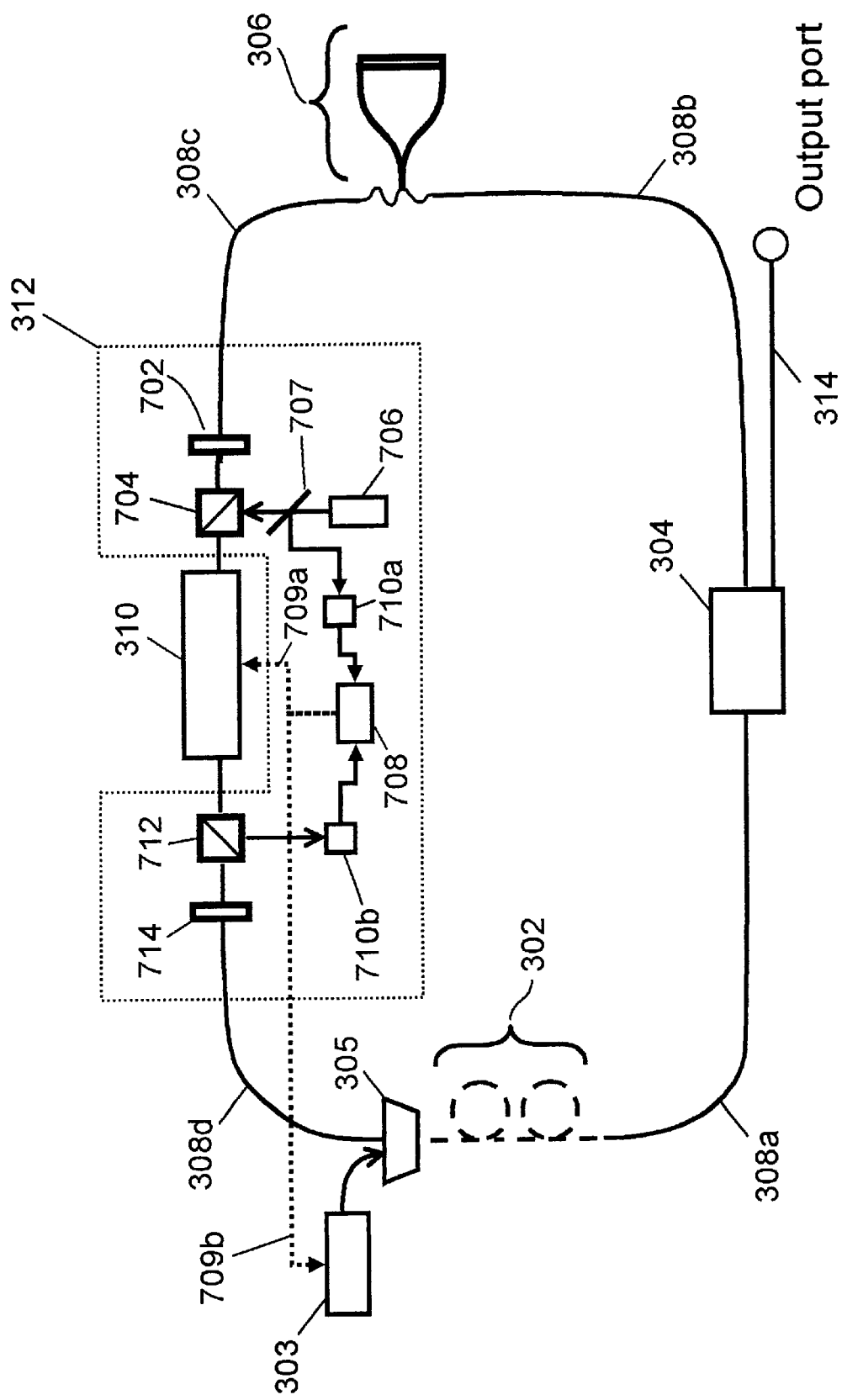
FIG. 7a illustrates a preferred embodiment of a wavelength and power stabilizer in the multi-wavelength light source in accordance with the present invention.

FIG. 7a illustrates a first preferred embodiment of a wavelength stabilizer 312 in accordance with the present invention. The wavelength stabilizer 312 (outlined) detects changes in the wavelengths and power of light generated by the light source 300 as it travels through the comb filter 310. Changes in the wavelength or power of the light could be caused by factors such as temperature changes. If a change is detected, the wavelength stabilizer 312 corrects for this change. The wavelength stabilizer 312 comprises a first optical isolator 702, a first wavelength division multiplexer 704 (WDM), a reference laser 706, a comb filter controller 708, detectors 710a–710b, a second WDM 712, and a second isolator 714. The reference laser 706 inserts a reference wavelength into the portion of the optical loop through the first WDM 704 (comprising the comb filter). The optical isolators 702 and 714 prevent this reference wavelength from traveling through other portions of the loop. An optical tap or splitter 707 diverts a small proportion of light from the reference light source 706 to the detector 710a. The reference wavelength then travels through the comb filter 310 along with the light comprising channel wavelengths. If the optical filtering properties of the comb filter 310 change, this change will be accompanied by a change in the intensity of the reference wavelength. When the transmission wavelengths and the reference wavelength exit from the comb filter 310, the reference wavelength is removed from the loop by the second WDM 712. This exiting reference light intensity as measured by detector 710b is then compared with the original reference light intensity as measured by the detector 710a. If there is a significant difference between the intensities measured by the two detectors 710a–710b, then the reference wavelength does not propagate through the comb filter correctly, which means that the transmission properties of the comb filter have also changed. The nature of the change is then communicated to the comb filter controller 708, which adjusts the comb filter 310 and the pump laser 303 to correct for the change. The comb filter adjustments may be made for instance to the tilt and depth adjusters 408 of the comb filter 400 (FIG. 4) or to the waveplate and interferometer tilt adjustments 614a–614b of the comb filter 500a (FIG. 6c). In this way, the light is maintained at the appropriate transmission wavelengths and at a consistent level of energy.

Figure 7B:
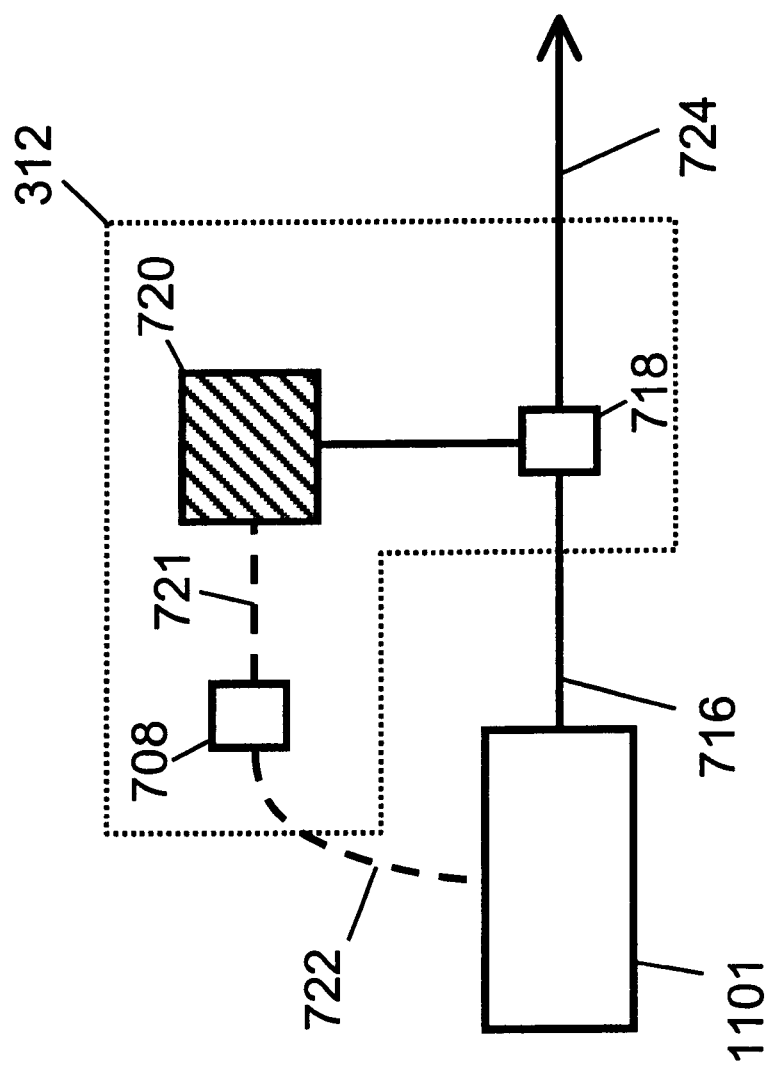
FIG. 7b illustrates a method by which an optical performance monitor controls the wavelength and power stabilizer of the multi-wavelength light source in accordance with the present invention.
Figure 9:
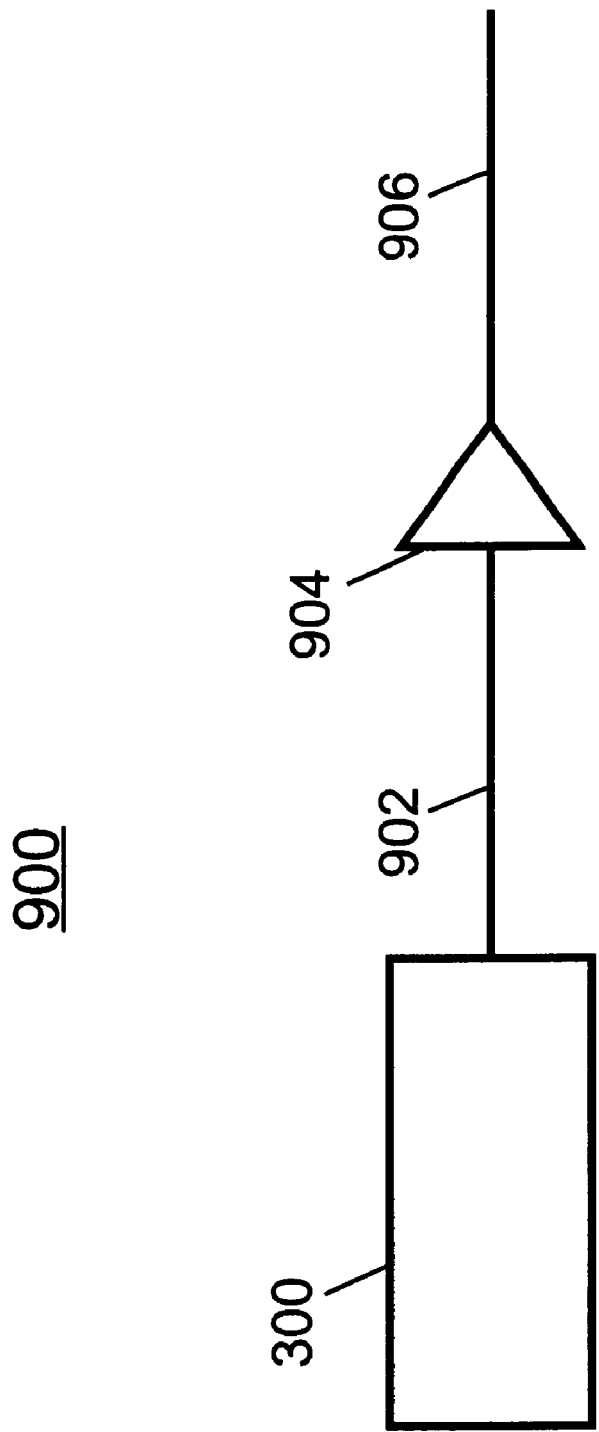
FIG. 9 illustrates a use of the multi-wavelength light source in accordance with the present invention with an optical amplifier.
Figure 10:
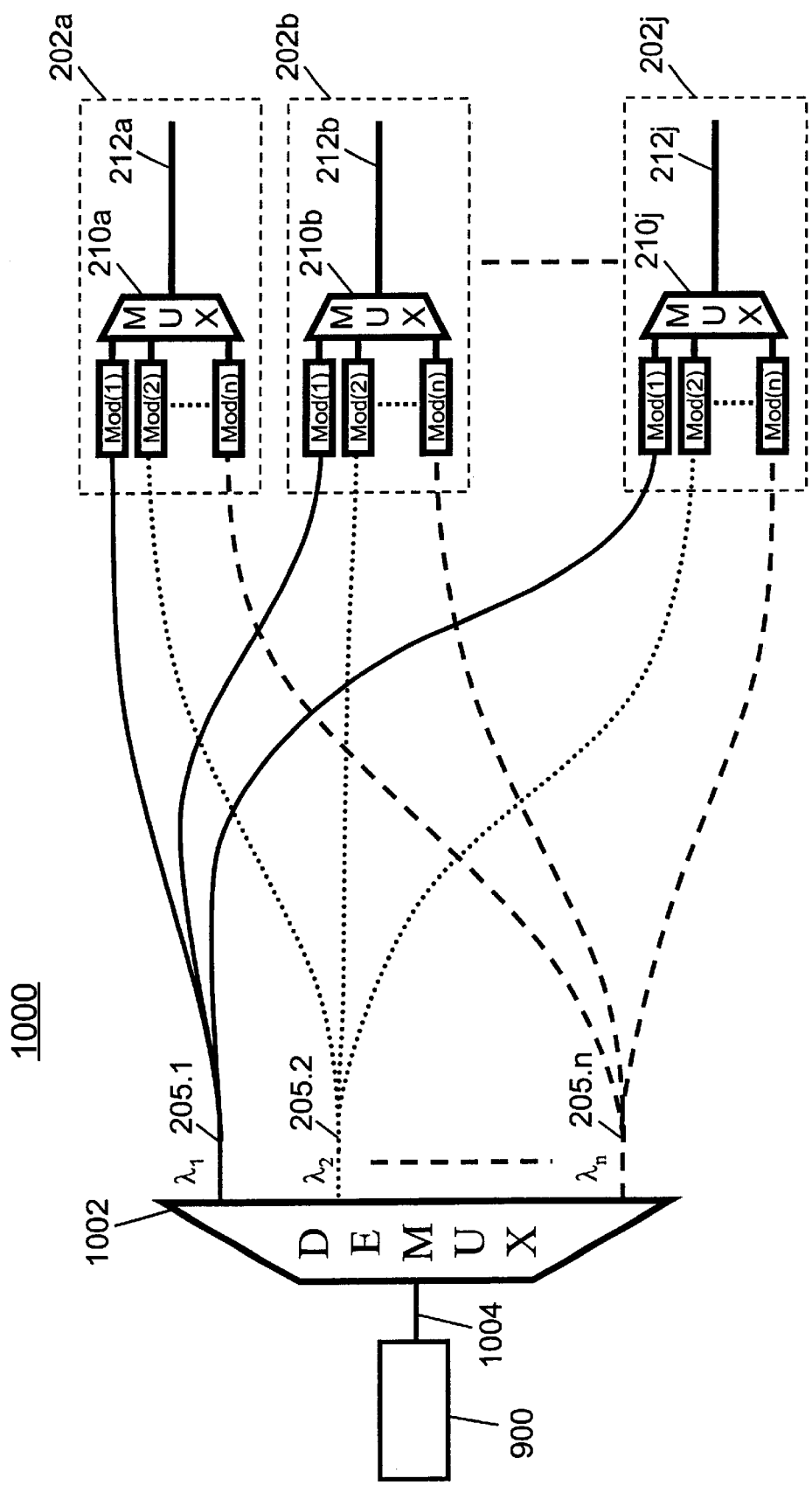
FIG. 10 illustrates an optical network that utilizes a multi-wavelength light source in accordance with the present invention.

FIG. 7b illustrates a second preferred embodiment of a wavelength and power stabilizer 312 in accordance with the present invention. The embodiment of the wavelength and power stabilizer illustrated in FIG. 7b is disposed external to the multi-wavelength light source 1101. In the preferred embodiments, the multi-wavelength light source 1101 comprises either the light source 300 (FIG. 3) or the light source 900 (FIG. 9, discussed in more detail following). However, the light source 1101 may comprise any suitable multi-wavelength light source wherein the optical output comprises a plurality of separated wavelength bands corresponding to a set of optical channels. The output light of the multi-wavelength light source 1101 is directed to an output fiber 716, and a small proportion of the output light is diverted to an optical performance monitor (OPM) 720 by the optical tap of splitter 718. An example of a suitable OPM is disclosed in a U.S. Pat. No. 6,394,910, assigned to the assignee of the present application. Applicant hereby incorporates this patent by reference in its entirety. The remaining light is passed along to the optical fiber system 724.

The OPM 720 receives a continuous sample of the output light from the multi-wavelength light source 1101 and, based upon this sample, provides continuous information about the wavelengths and powers of each of the plurality of optical channels comprising this light. This information is communicated from the OPM to the comb filter controller 708 via the electronic or electrical link 721. The comb filter controller 708 compares the calculated wavelengths and powers of the plurality of channels to their nominal or expected values. If there is an unacceptably high drift in either wavelengths or powers, the comb filter controller 708 communicates adjustment information to the multi-wavelength light source 1101 over the electronic or electrical link 722. Adjustments are thereby made to either the comb filter 310 and/or the pump laser 303 comprising the light source 1101 so as to bring the output wavelengths and powers back to their nominal values. The comb filter adjustments may be made, for instance, to the tilt and depth adjusters 408 of the comb filter 400 (FIG. 4) or to the waveplate and interferometer tilt adjustments 614a-614b of the comb filter 500a (FIG. 6c). The output light of the multi-wavelength light source 101 is directed to an output fiber 716 and a small proportion of the output light is diverted to the OPM 720 by an optical tap or optical splitter 718.

Figure 8:
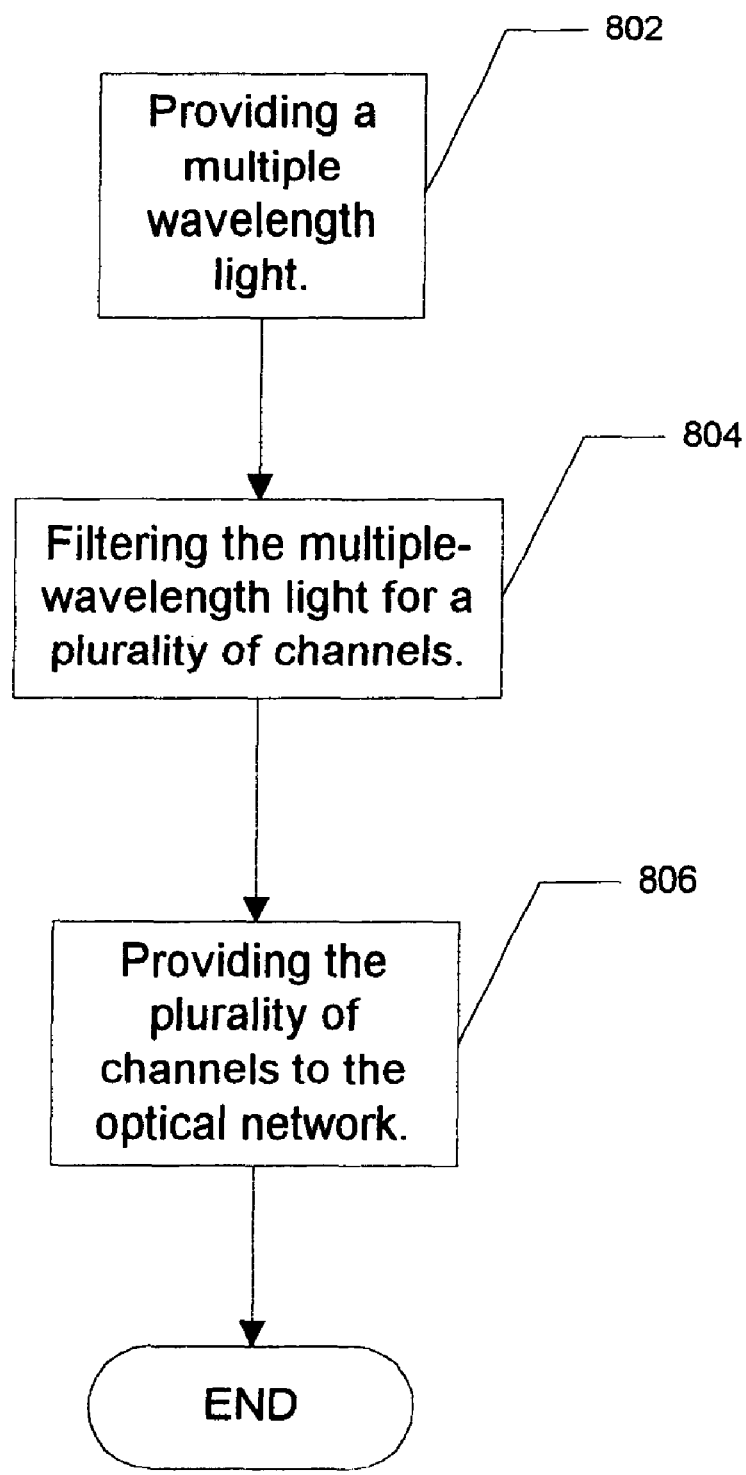
FIG. 8 is a flow chart illustrating a preferred embodiment of a method for providing a multiple-wavelength light in accordance with the present invention.

FIG. 8 is a flow chart illustrating a preferred embodiment of a method of providing a multiple-wavelength light source in accordance with the present invention. First, a multiple wavelength light is provided, via step 802. In the preferred embodiment, the multiple wavelength light is provided by the EDF 302. Next, the multiple-wavelength light is filtered so as to only match the wavelengths for a plurality of optical channels, via step 804. In the preferred embodiment, the comb filter performs the filtering, as described above. Then, the plurality of channels is provided to the optical network, via step 806. In the preferred embodiment, the channels are outputted to the optical network via the coupler 304 along the single-mode fiber 314.

FIG. 9 illustrates a high-power wavelength light source in accordance with the present invention. The high-power multi-wavelength light source 900 comprises a first multi-wavelength light source 300 wherein the optical output of the first preferred embodiment of the multi-wavelength light source 300 is optically coupled to the optical input of an optical amplifier 904. Preferably, the optical coupling 902 between the multi-wavelength light source 300 and the optical amplifier 904 comprises an optical fiber and the optical amplifier 904 comprises an Erbium-Doped Fiber Amplifier (EDFA) which is well known in the art. Through a well-known operation, the output 906 of the optical amplifier 904 comprises the same wavelengths as output from the multi-wavelength light source 300. However, the power at each of the wavelengths is significantly increased or multiplied relative to the power output from the multi-wavelength light source 300.

Figure 2:
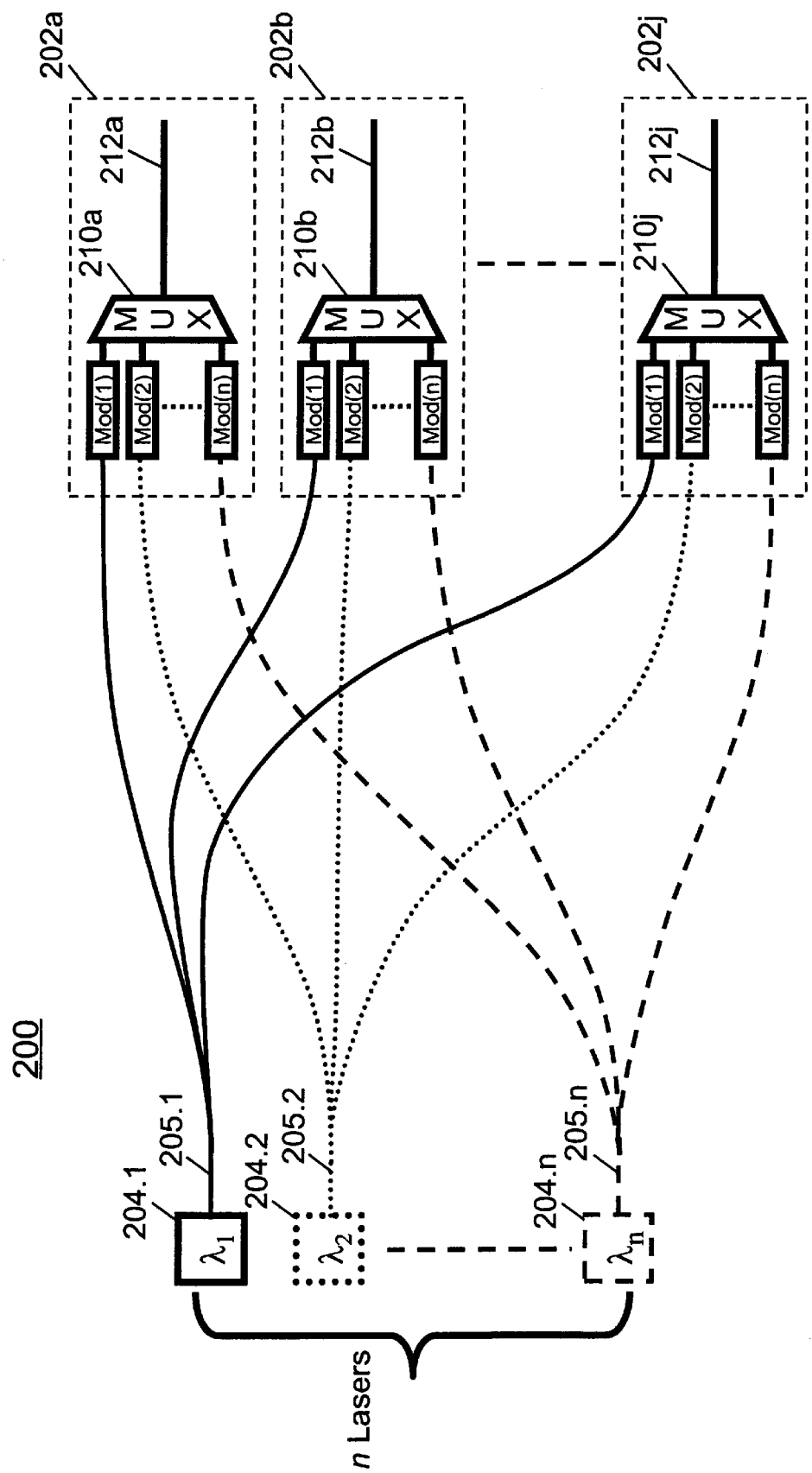
FIG. 2 illustrates another conventional laser source system in an optical network.

The power output of the high-power wavelength light source 900 is suitable for splitting light among a plurality of WDM systems. This is illustrated by the system in FIG. 10, which comprises an optical network in accordance with the present invention. The network system 1000 (FIG. 10) is similar to the network system 200 (FIG. 2) except that the n lasers 204.1–204.n are replaced by a single high-power multi-wavelength light source 900, a demultiplexer (DEMUX) 1002 and an optical coupling 1004 between the light source 900 and the DEMUX 1002. Preferably, the optical coupling 1004 comprises an optical fiber.

Figure 1:
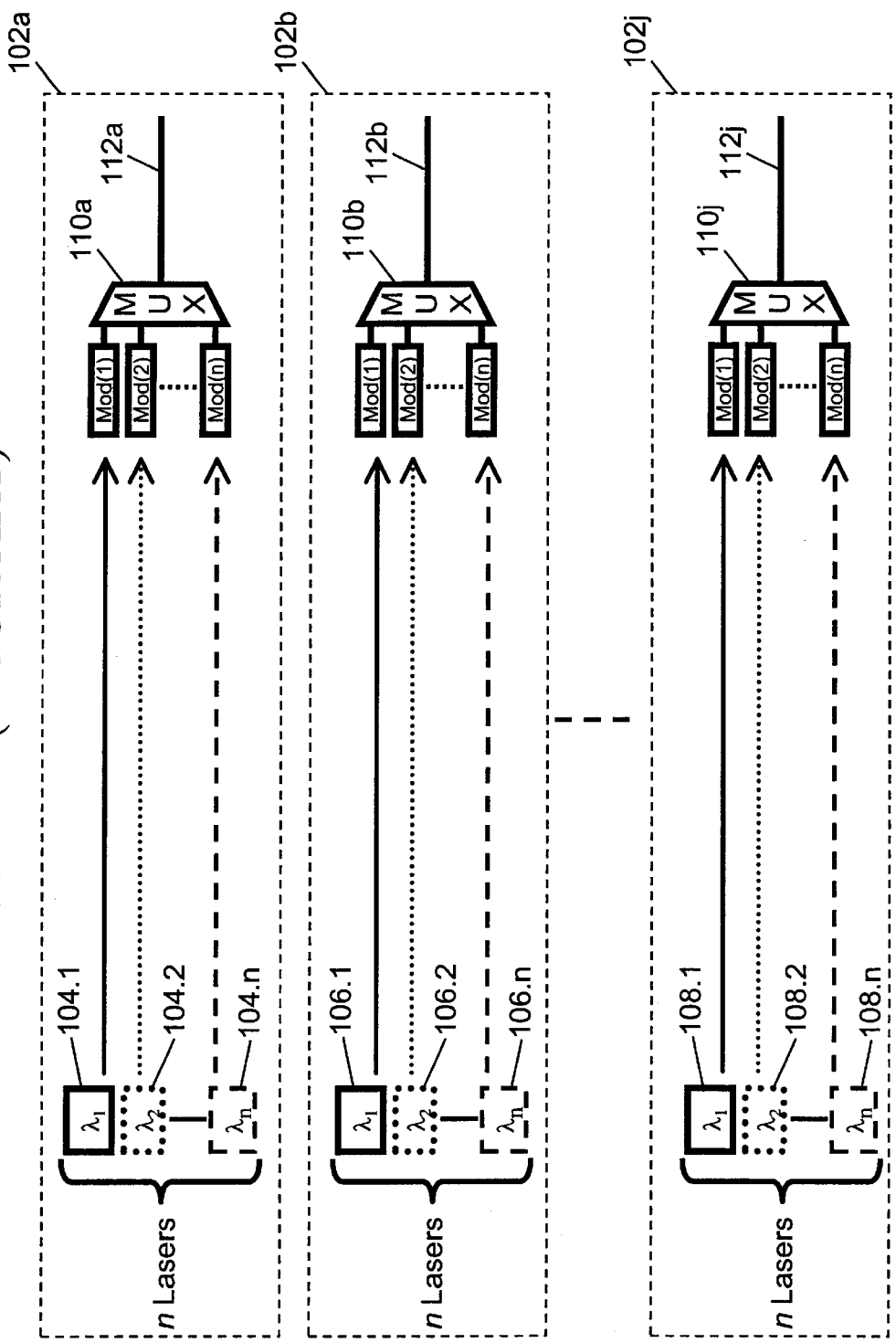
FIG. 1 illustrates a conventional laser source system in an optical network.

Within the network system 1000, the optical output of the high-power multi-wavelength light source 900 comprises a light of a plurality (n) of separated wavelength bands wherein each one of the n bands comprises a restricted range of wavelengths about the nominal wavelength of a respective optical channel. This light output is delivered to the DEMUX 1002 through the optical coupling 1004. The DEMUX 1002 separates the multi-wavelength light into its component wavelength bands, denoted as $\lambda_1, \lambda_2, \ldots, \lambda_n$. Each separated wavelength band is output by the DEMUX 1002 to a respective one of the output lines 205.1–205.n and each of these output lines is split ten ways (for instance) amongst the WDM output systems 202a–202j. Compared to the network illustrated in FIG. 1, the single multi-wavelength light source 900 of the network system 1000 (FIG. 10) can replace the 10×n lasers 104.1–108.n. Compared to the network illustrated in FIG. 2, the single multi-wavelength light source 900 of the network system 1000 (FIG. 10) can replace the n lasers 204.1–204.n. Thus, the present invention can reduce the total number of required light sources significantly.

Figure 11:
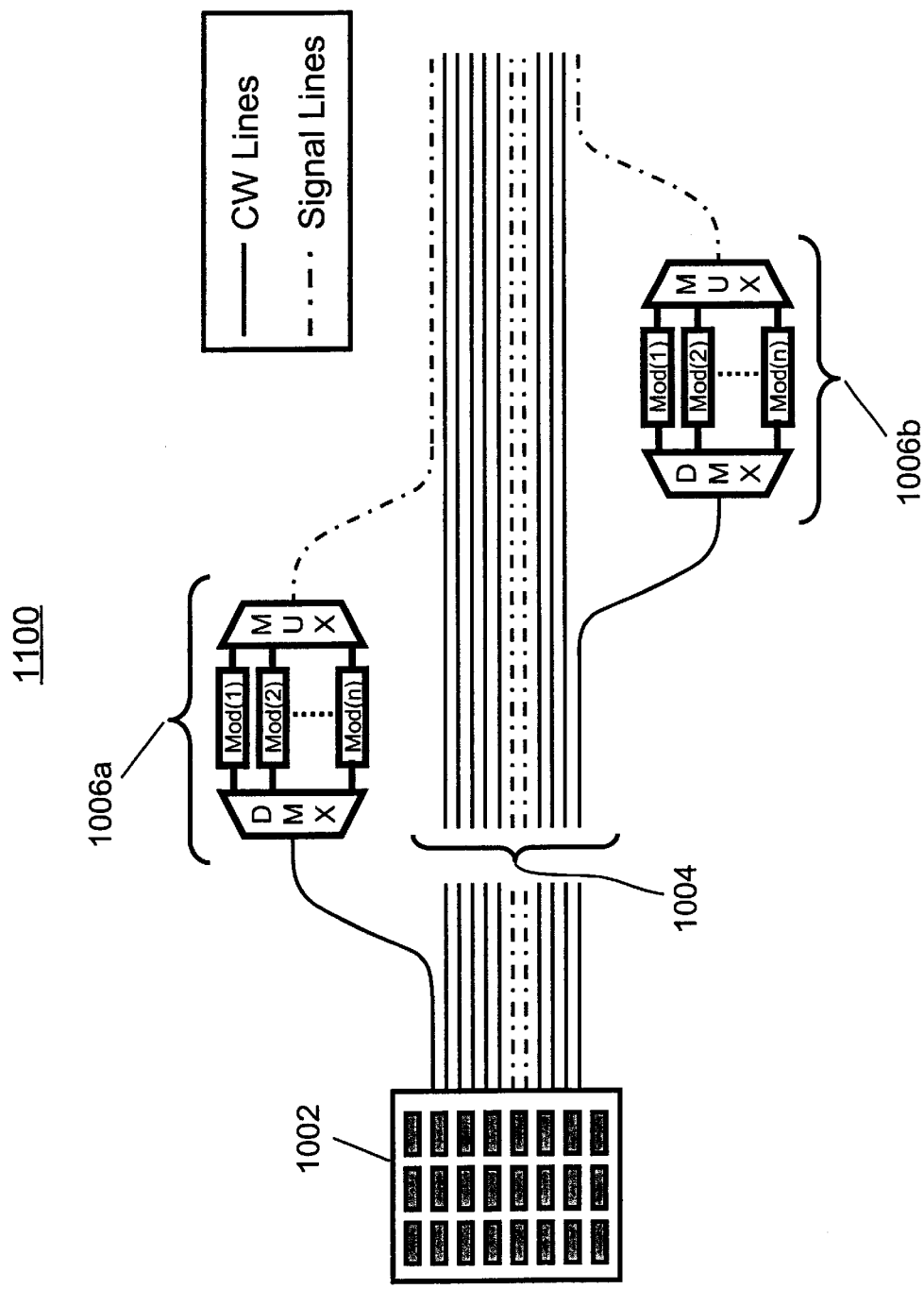
FIG. 11 illustrates the use of the multi-wavelength light source of the present invention in a central light source bank.

FIG. 11 illustrates the present invention's method and system of providing the multi-wavelength light source 900 as used in a centralized light source distribution system. A plurality of the multi-wavelength light sources 900 of the present invention resides in a central light source 1002. A set of fiber optic cables 1004 carry either signal-carrying light (modulated) or continuous wave light (unmodulated). The continuous wave light is later modulated "down stream" at a peripheral office more conveniently located. Thus, the central laser light-source 1002 of the multi-wavelength light sources of the present invention may function as the light source for many different peripheral offices 1006a, 1006b, etc., eliminating the need for these offices to have their own light source.

Figure 12:
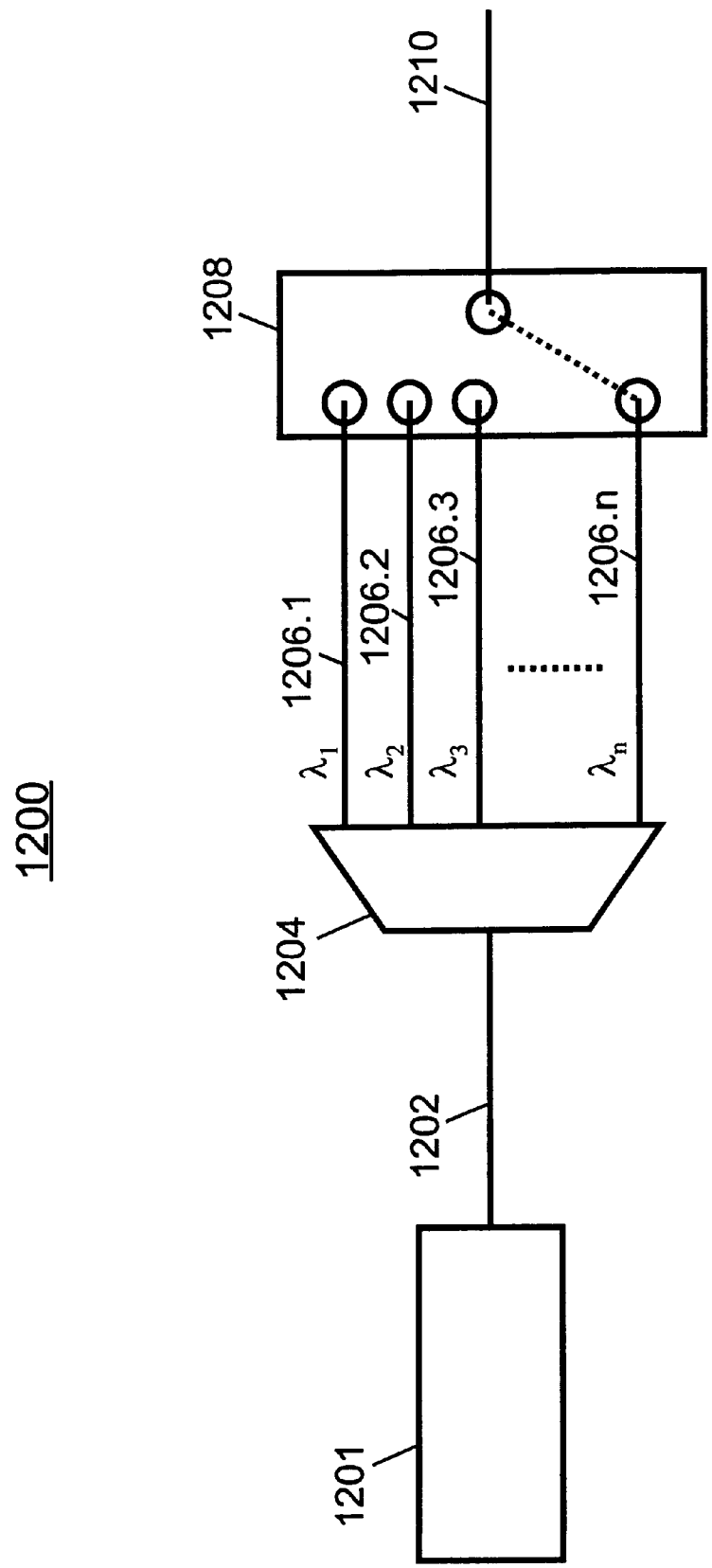
FIG. 12 illustrates a use of-the multi-wavelength light source in accordance with the present invention together with a de-multiplexer and an n×1 optical switch.

FIG. 12 illustrates a switchable single wavelength light source in accordance with the present invention. The switchable light source 1200 comprises a multi-wavelength light source 1201, a demultiplexer (DEMUX) 1204 and an n×1 optical switch 1208. The switchable light source 1200 further comprises an optical coupling 1202 from the output of the multi-wavelength light source 1201 to the input of the DEMUX 1204, a set of optical couplings 1206.1–1206.n from the output of the DEMUX 1204 to the n inputs of the n×1 optical switch 1208 and an optical fiber line or system 1210 optically coupled to the output of the switch 1208. Preferably, the optical coupling 1202 and the optical couplings 1206.–1206.n all comprise optical fibers. The multi-wavelength light source 1201 may comprise either the light source 300 (FIG. 3) or the high-power light source 900 (FIG. 9).

Within the switchable light source 1200 (FIG. 12), the optical output of the multi-wavelength light source 1201 comprises a light of a plurality (n) of separated wavelength bands wherein each one of the n bands comprises a restricted range of wavelengths about the nominal wavelength of a respective one of the n optical channels. This light output is delivered to the DEMUX 1204 through the optical coupling 1202. The DEMUX 1204 separates the multi-wavelength light into its component wavelength bands, denoted as $\lambda_1, \lambda_2, \ldots, \lambda_n$. Each separated wavelength band is output by the DEMUX 1002 to a respective one of the optical couplings 1206.1–1206.n and each one of the optical couplings 1206.1–1206.n delivers a wavelength band to a respective one of the n input ports of the n×1 optical switch 1208. The optical switch 1208 is capable of selecting among the n wavelength bands $\lambda_1, \lambda_2, \ldots, \lambda_n$ so as to deliver light comprising a single one of the wavelength bands to the optical fiber line or system 1210. The remaining wavelength bands that are not so-selected are discarded. In this fashion, the apparatus 1200 functions as a switchable light source.

A multi-wavelength light source for an optical network has been disclosed. The light source of the present invention is designed to only emit wavelengths that correspond to optical transmission channels while eliminating the rest. It suppresses possible mode hopping, thus maintaining the power stability of all channels. Since multiple wavelengths are provided in a single light source, the number of light sources required to service a network can be dramatically reduced, increasing efficiency and reducing the cost of equipment and time for maintenance as well.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a light source in an optical network, comprising the steps of:
   (a) providing a multiple-wavelength light;
   (b) inserting a reference wavelength into the multi-wavelength light;
   (c) filtering the multiple-wavelength light into a plurality of separated wavelength bands for a plurality of channels;
   (d) removing the filtered reference wavelength from the multiple-wavelength light;
   (e) analyzing an intensity of the filtered reference wavelength; and
   (f) adjusting the filtering of the multiple-wavelength light based upon the analysis.

2. The method of claim 1, wherein the filtering step (c) comprises:
(c1) filtering the multiple-wavelength light into the plurality of separated wavelength bands for the plurality of channels utilizing a comb filter.

3. The method of claim 2, wherein the comb filter comprises:
an input optical fiber for inputting the multiple-wavelength light; and
at least one glass block optically coupled to the input optical fiber, the at least one glass block partially interrupting the multiple-wavelength light.

4. The method of claim 3, wherein the comb filter further comprises:
a first lens optically coupled between the input optical fiber and the at least one glass block;
an output optical fiber optically coupled to the at least one glass block;
a second lens optically coupled between the at least one glass block and the output optical fiber; and
a plurality of adjustment means coupled to each of the at least one glass block for adjusting a depth of penetration into the optical signal and for a tilt angle.

5. The method of claim 4, wherein each of the at least one glass block is positioned based upon a plurality of parameters, the plurality of parameters comprising:
a coverage of a cross-sectional area of the optical signal;
a tilt angle;
a thickness;
a material; and
a refractive index.

6. The method of claim 2, wherein the comb filter comprises:
an input optical fiber;
a lens optically coupled to the input optical fiber disposed at a distance equal to the focal length of the lens;
at least one birefringent wedge optically coupled to the lens at a side opposite to the input optical fiber; and
a non-linear interferometer optically coupled to the at least one birefringent wedge at a side opposite to the lens.

7. The method of claim 6, wherein the non-linear interferometer comprises:
a first glass plate optically coupled to a second glass plate, forming a cavity;
a first reflective coating residing inside the cavity and on the second glass plate;
a second reflective coating residing inside the cavity and on the first glass plate;
a first waveplate residing inside the cavity between the first and second glass plates; and
a second waveplate residing outside the cavity and optically coupled to the first glass plate.

8. The method of claim 7, wherein the non-linear interferometer further comprises at least one adjuster coupled to the first waveplate.

9. A method for providing a light source in an optical network, comprising the steps of:
(a) providing a multiple-wavelength light; and
(b) filtering the multiple-wavelength light into a plurality of separated wavelength bands for a plurality of channels utilizing a comb filter, the comb filter comprising:
an input optical fiber for inputting the multiple-wavelength light; and
at least one glass block optically coupled to the input optical fiber, the at least one glass block partially interrupting the multiple-wavelength light.

10. The method of claim 9, wherein the comb filter further comprises:
a first lens optically coupled between the input optical fiber and the at least one glass block;
an output optical fiber optically coupled to the at least one glass block;
a second lens optically coupled between the at least one glass block and the output optical fiber; and
a plurality of adjustment means coupled to each of the at least one glass block for adjusting a depth of penetration into the optical signal and for a tilt angle.

11. The method of claim 10, wherein each of the at least one glass block is positioned based upon a plurality of parameters, the plurality of parameters comprise:
a coverage of a cross-sectional area of the optical signal;
a tilt angle;
a thickness;
a material; and
a refractive index.

12. The method of claim 9, further comprising the steps of:
(c) stabilizing the filtered plurality of separated wavelength bands; and
(d) providing the stabilized plurality of separated wavelength bands to the optical network.

13. The method of claim 12, wherein the stabilizing step (c) comprises:
(c1) inserting a reference wavelength into the multiple-wavelength light prior to the filtering step (b);
(c2) removing the filtered reference wavelength from the multiple-wavelength light after the filtering step (b);
(c3) analyzing an intensity of the filtered reference wavelength; and
(c4) adjusting the filtering step (b) based upon the analysis.

14. A method for providing a light source in an optical network, comprising the steps of:
(a) providing a multiple-wavelength light; and
(b) filtering the multiple-wavelength light into a plurality of separated wavelength bands for a plurality of channels utilizing a comb filter, the comb filter comprising:
an input optical fiber;
a lens optically coupled to the input optical fiber disposed at a distance equal to the focal length of the lens;
at least one birefringent wedge optically coupled to the lens at a side opposite to the input optical fiber; and
a non-linear interferometer optically coupled to the at least one birefringent wedge at a side opposite to the lens.

15. The method of claim 14, wherein the non-linear interferometer comprises:
a first glass plate optically coupled to a second glass plate, forming a cavity;
a first reflective coating residing inside the cavity and on the second glass plate;
a second reflective coating residing inside the cavity and on the first glass plate;

a first waveplate residing inside the cavity between the first and second glass plates; and a second waveplate residing outside the cavity and optically coupled to the first glass plate.

16. The method of claim 15, wherein the non-linear interferometer further comprises at least one adjuster coupled to the first waveplate.

17. The method of claim 14, further comprising the steps of:

(c) stabilizing the filtered plurality of separated wavelength bands; and (d) providing the stabilized plurality of separated wavelength bands to the optical network.

18. The method of claim 17, wherein the stabilizing step (c) comprises:

(c1) inserting a reference wavelength into the multiple-wavelength light prior to the filtering step (b);

(c2) removing the filtered reference wavelength from the multiple-wavelength light after the filtering step (b);

(c3) analyzing an intensity of the filtered reference wavelength; and (c4) adjusting the filtering step (b) based upon the analysis.

* * * * *